United States Patent [19]
Yaeger

[11] Patent Number: 5,515,489
[45] Date of Patent: May 7, 1996

[54] COLLISION DETECTOR UTILIZING COLLISION CONTOURS

[75] Inventor: Larry S. Yaeger, Los Gatos, Calif.

[73] Assignee: Apple Computer, Inc., Cupertino, Calif.

[21] Appl. No.: 391,254

[22] Filed: Feb. 17, 1995

Related U.S. Application Data

[63] Continuation of Ser. No. 816,615, Dec. 31, 1991, abandoned.

[51] Int. Cl.$^6$ .................................................. G06F 15/00
[52] U.S. Cl. ......................... 395/152; 395/133; 395/141
[58] Field of Search ........................... 395/152, 90, 141, 395/133, 137, 138; 345/122

[56] References Cited

U.S. PATENT DOCUMENTS

| | | | |
|---|---|---|---|
| 4,053,740 | 10/1977 | Rosenthal | 364/705 |
| 4,862,373 | 8/1989 | Meng | 364/444 |
| 4,888,707 | 12/1989 | Shimada | 395/90 |
| 4,894,774 | 1/1990 | McCarthy et al. | 364/410 |
| 4,905,147 | 2/1990 | Logg | 364/410 |
| 5,047,916 | 9/1991 | Kondo | 364/167.01 |
| 5,058,024 | 10/1991 | Inselberg | 364/461 |
| 5,247,608 | 9/1993 | Flemming et al. | 395/90 |
| 5,249,264 | 9/1993 | Matsumoto | 395/134 |
| 5,261,041 | 11/1993 | Susman | 395/512 |
| 5,287,446 | 2/1994 | Williams et al. | 395/152 |
| 5,325,476 | 6/1994 | Takii et al. | 395/141 |

OTHER PUBLICATIONS

Bonner et al., "A Representation Scheme for Rapid 3-D Collision Detection", *Proceedings of 1988 IEEE Int'l Symposium on Intelligent Control*, pp. 320–325 (Aug. 24, 1988).

Dai, "Collision–Free Motion of an Articulated Kinematic Chain in a Dynamic Environment", *IEEE Computer Graphics & Applications*, v. 9, N. 1, pp. 70–74 (Jan. 1989).

Cameron, "Collision detection by four–dimensional intersection testing", *IEEE Transactions on Robotics and Automation*, v. 6, N. 3, pp. 291–302 (Jun. 1990).

Lin et al., "A Fast Algorithm for Incremental Distance Calculation", *Proceedings of 1991 IEEE Int'l Conf. on Robotics and Automation*, v. 2, pp. 1008–1014, (Apr. 9, 1991).

Pan et al., "A Feasible Collision–Detection Algorithm for Mobile Robot Motion Planning with Moving Obstacles", *Proceedings of 1991 Int'l Conf. on Industrial Electronics, Control, and Instrumentation* (IECON '91), v. 2, pp. 1011–1016 (Oct. 28, 1991).

Steele, "An Algorithm with Real–Time Response for Avoiding Moving Obstacles", *Proceedings of 1989 IEEE Int'l Conf. on Systems, Man, and Cybernetics*, v. 2, pp. 551–556 (Nov. 14, 1989).

*Primary Examiner*—Heather R. Herndon
*Assistant Examiner*—Joseph R. Burwell
*Attorney, Agent, or Firm*—Blakely, Sokoloff, Taylor & Zafman

[57] ABSTRACT

A method and apparatus for determining and displaying or preventing a collision between two objects. Certain characteristics of these two objects such as their sizes, orientations, and velocities, are inputted. Based upon these characteristics, a collision contour is generated about the first object. If either or both object(s) had been moved, the collision contour is generated based on a velocity outline to account for the velocity effects. These two objects have collided if the second object's centerpoint is included in the collision contour. Otherwise, the two objects have not collided. The result is then portrayed on a graphics display device.

20 Claims, 11 Drawing Sheets

COLLISION DETECTOR UTILIZING COLLISION CONTOURS

This is a continuation of application Ser. No. 07/816,615, filed Dec. 31, 1991, now abandoned.

FIELD OF THE INVENTION

The present invention relates to computer graphics and specifically, to a method of detecting whether two objects, as represented by a computer model, have collided or not. More particularly, this invention relates to an apparatus and method whereby a collision contour is generated, such that velocity effects are taken into consideration. Based upon this contour, a determination is made as to whether two objects have collided, and the display of the objects by the computer system is adjusted according to whether or not the two objects have collided.

BACKGROUND OF THE INVENTION

Graphical display techniques have been used on computers allowing the simulation of models of a concrete or abstract entity. The purpose of a model is to allow the user to visualize and understand the structure or behavior of the entity. A computer model, thereby, provides a convenient vehicle for experimentation with and prediction of the effects of inputs or modifications to the model. In particular, geometric models are well suited for graphical computer modeling. This is due to the fact that geometric models describe components with inherent geometrical properties which lend themselves easily to graphical representations. As can be expected, there are many aspects inherent with graphical geometric computer modeling. Among these are geometrical transformations, viewing in three dimensions, user interfacing, representing curves and surfaces, solid modeling, illumination, shading, visible-surface determination, image manipulation, etc.

The present invention is directed to one problem associated with graphical geometric computer modeling. The present invention is directed towards displaying the collision between two objects. In the past, collision detection was done by testing every edge/surface of the first object against every edge/surface of the second object and testing for inclusion. Then, this process is repeated in its entirety with the objects being reversed (i.e. testing every edge/surface of the second object against every edge/surface of the first object and testing for inclusion). For detailed collision detection, one would need to factor in the individual polygon or any curved surfaces of the objects. This traditional method for detecting collisions is very tedious and time consuming and thus, displaying the results of collisions takes a long time as the computations delay the final resulting display. What is needed is a faster, more efficient method for detecting collisions and then displaying the results of whether or not collisions have occurred.

One of the limitations of the prior art is that velocity effects are often ignored. The prior techniques typically test for collision in one frame and then test for collision in a subsequent, later frame. If there are no collisions detected in either frame, the prior techniques assume that there were no collisions in between the two frames. However, this assumption can sometimes be erroneous. One remedy is to take incrementally smaller time steps in between frames and testing for collisions within the closely spaced time frames. Again, this process is very tedious and time consuming. What is needed is an apparatus/method for displaying whether two objects which had been moved have collided or not at any point of their movement.

SUMMARY AND OBJECTS OF THE INVENTION

One objective of the present invention is to display whether or not two objects have collided.

Another objective of the present invention is to enclose the two objects by bounding boxes and determining whether the two objects had collided by testing whether the bounding boxes had collided.

Another objective of the present invention is to take into account the velocity effects of either one or both objects in determining whether the objects have collided.

Another objective of the present invention is to use a method to successively test for the inclusion of the center point of the second object within the collision contour.

These and other objects of the invention are provided for by a method and apparatus for generating a collision contour, detecting a collision between two objects based on the collision contour, and displaying the result. Certain characteristics of these two objects, such as sizes, orientations, and velocities are first inputted. Based upon these characteristics, a collision contour is generated for the first object. If either or both of the objects have been moved, the collision contour is deformed by a velocity outline to account for the velocity effects. Next, the centerpoint of the second object is determined. This centerpoint is tested to see whether it is included within the collision contour. If so, this indicates that the two objects had collided. Otherwise, the two objects had not collided. The computer generated display of the objects is adjusted according to whether a collision has occurred.

Other objects, features, and advantages of the present invention will be apparent from the accompanying drawings and from the detailed description which follows below.

BRIEF DESCRIPTION OF DRAWINGS

The present invention is illustrated by way of example and is not limited to the figures of the accompanying drawings, in which like references indicate similar elements, and in which.

DETAILED DESCRIPTION OF THE INVENTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

Figure 1:
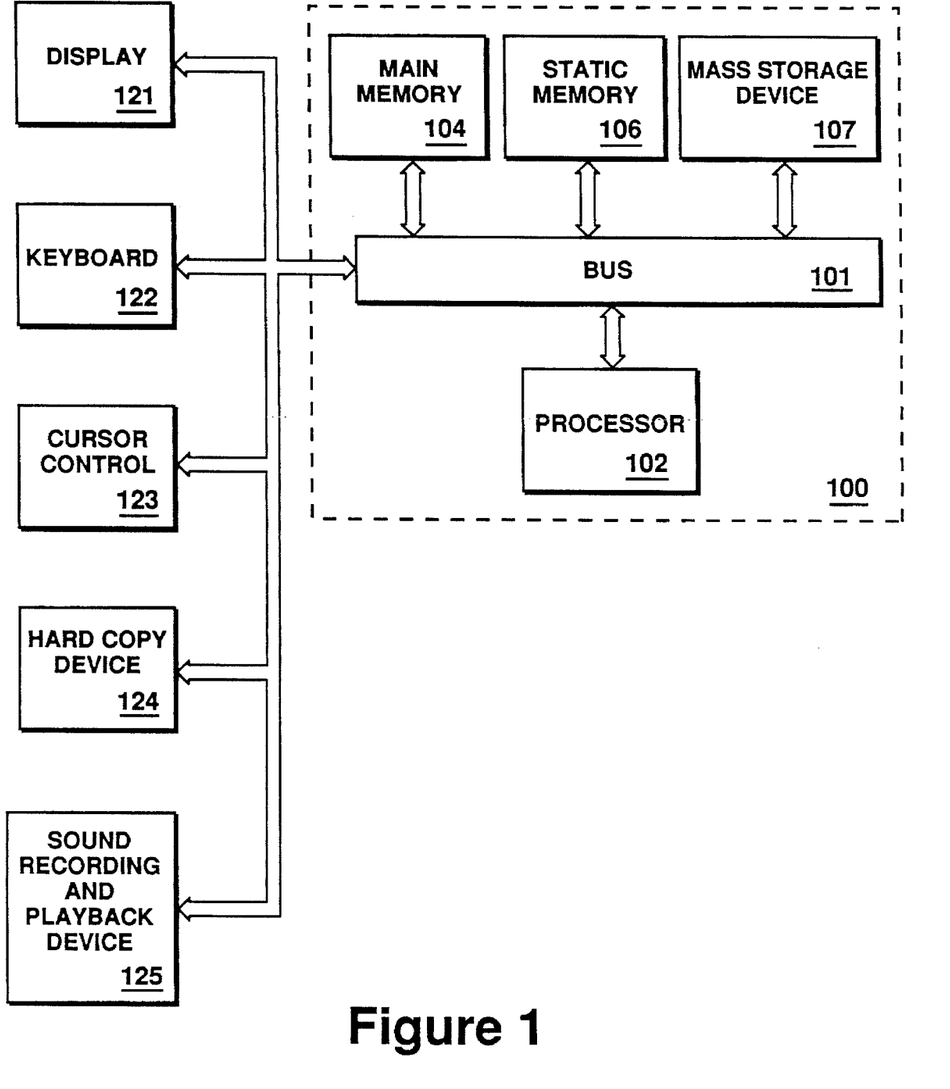
FIG. 1 is a block diagram of a computer system upon which the present invention may be practiced.

Referring to FIG. 1, the computer system upon which the preferred embodiment of the present invention is implemented is shown as 100. Computer system 100 comprises a bus or other communication means 101 for communicating information, and a processing means 102 coupled with bus 101 for processing information. The processing means 102 will typically determine the collision contour of an object by determining the vertices of the contour according to the method described below. System 100 further comprises a random access memory (RAM) or other dynamic storage device 104 (referred to as main memory), coupled to bus 101 for storing information and instructions to be executed by processor 102. Thus, the vertices of the collision contour of the present invention will typically be stored in memory 104. Main memory 104 also may be used for storing input parameters (e.g., sizes, orientations, and velocity vectors) for each object to be tested, temporary variables defining angular relationships, and the values for certain display elements depending on whether there has been a collision or not. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) coupled to bus 101 for displaying information to a computer user. This display device will typically display the results of a collision (or lack thereof) between two objects according to the method described below. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such as an audio digitizer means coupled to a microphone for recording information.

Figure 2:
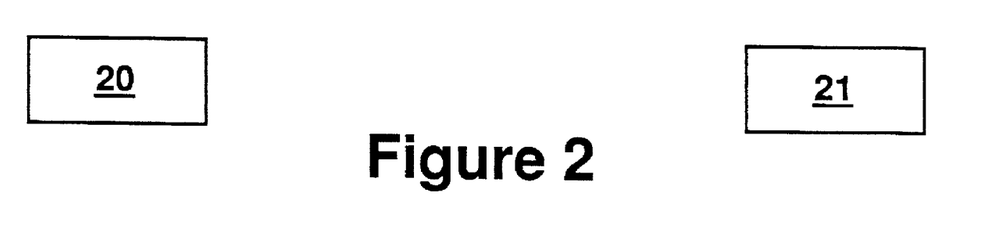
FIG. 2 shows two non-colliding rectangles.
Figure 3:
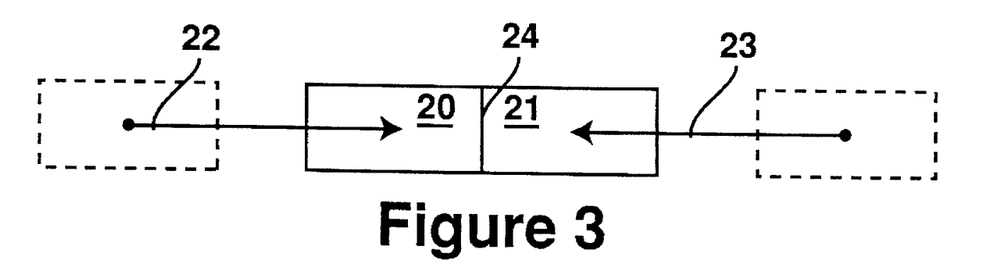
FIG. 3 shows two rectangles which have just collided.
Figure 4:
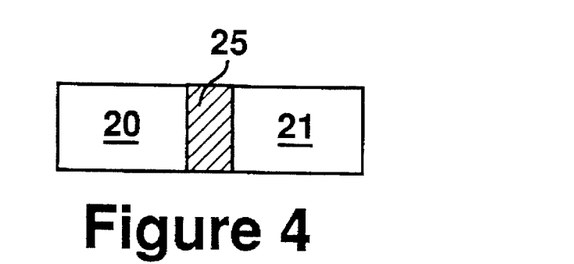
FIG. 4 shows two colliding rectangles with overlap.

For simplicity of illustration, two rectangles are used to demonstrate the present invention. Referring to FIG. 2, a first rectangle 20 and a second rectangle 21, which are stationary and have not collided, are shown. FIG. 3 shows the situation wherein rectangles 20 and 21 have moved a distance and direction according to arrows 22 and 23, respectively, and have just collided. The dashed rectangles depict the initial positions of rectangles 20 and 21. Line 24 (shown in bold) is where rectangles 20 and 21 have just collided. FIG. 4 shows a situation wherein rectangles 20 and 21 have already collided and now intrude upon each other's boundaries. Shaded portion 25 represents the area of intrusion wherein rectangles 20 and 21 overlap. The collisions depicted in FIGS. 3 and 4 will be detected and displayed by the present invention.

Collision Contours

Figure 5:
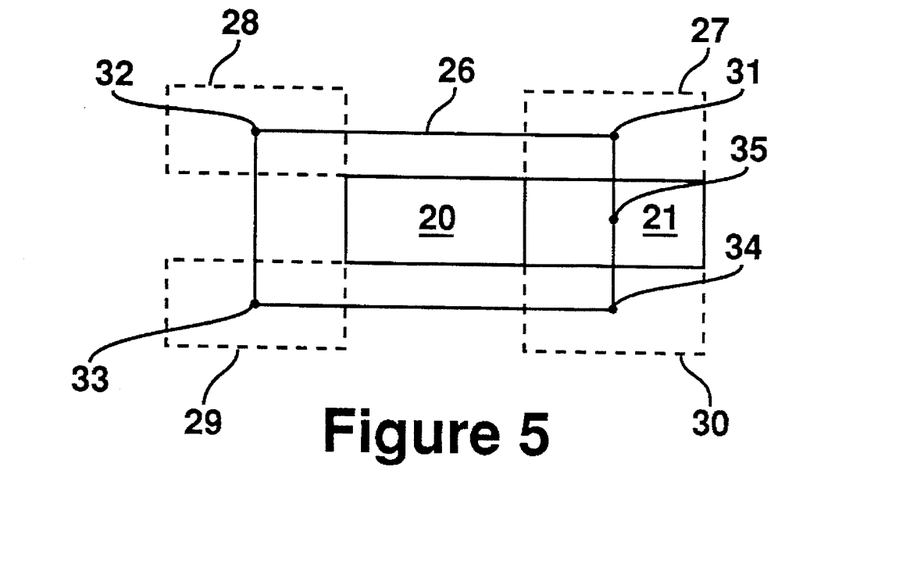
FIG. 5 shows a collision contour for two rectangles.

In order to detect and display these collisions, a collision contour is first generated. A collision contour 26 for rectangles 20 and 21 can be visualized graphically, as shown in FIG. 5. Collision contour 26 can be visualized by positioning rectangle 21 adjacent to rectangle 20 so that they touch but do not overlap. Rectangle 20 is kept stationary. Meanwhile, rectangle 21 is moved around the perimeter of rectangle 20 such that their edges are always touching but never overlapping. The outline traced by centerpoint 35 of rectangle 21 as it is dragged in this fashion one complete circuit around the perimeter of rectangle 20, defines collision contour 26.

This process is illustrated in FIG. 5 by initially placing rectangle 21 so that its left side touches but does not overlap the right side of rectangle 20. Next, rectangle 21 is moved upwards vertically, such that the two rectangle's sides are always just touching, but not overlapping. Rectangle 21 is continually moved upwards vertically until it can no longer be moved in this direction without losing touch of rectangle 20. The position wherein this occurs is shown by dashed rectangle 27. Then, rectangle 21 is moved horizontally to the left, such that the bottom of rectangle 21 just touches but does not overlap the top side of rectangle 20. Rectangle 21 is moved to the left in this manner until it can no longer be moved without losing touch of rectangle 20. The position occupied by rectangle 21 when this occurs is shown by dashed rectangle 28. Next, rectangle 21 is similarly moved in a downward vertical motion. The position whereby rectangle 21 can no longer be moved downward without losing touch of rectangle 20 is shown by dashed rectangle 29. Next, rectangle 21 is similarly moved horizontally to the right. Dashed rectangle 30 represents the position whereby rectangle 21 may no longer be moved horizontally to the right without losing touch of rectangle 20. Finally, rectangle 21 is moved vertically upwards until it reaches its initial starting point.

The path traced by centerpoint 35 of rectangle 21 when moved according to the method described above, defines the outline of collision contour 26. Given these shapes, sizes, and orientations, collision contour 26 will be generated for rectangle 20. It will be appreciated that the collision contour is determined relative to the shapes, sizes and orientations of both objects.

Note that collision contour 26 may be generated by connecting the four vertices 31, 32, 33, and 34. In one preferred embodiment, collision contour 26 is generated by connecting the vertices 31–34 with straight lines. However, the method described in the preceding paragraph can be used to help the user in visualizing the collision contour.

Although the above example describes moving rectangle 21 in a counter-clockwise manner about rectangle 20, this same collision contour 26 is traced if rectangle 21 is moved clockwise about rectangle 20. Also, the same collision contour 26 is traced, regardless of the initial starting point rectangle 21. As long as rectangle 21 is moved a complete circuit about rectangle 20, collision contour 26 will be traced. Also, note that even if rectangle 21 makes more than one circuit about rectangle 20, the same collision contour 26 is retraced.

The significance of a collision contour is that anytime the centerpoint of the second object touches any part of the collision contour of the first object, a collision has just occurred between the two objects. Anytime the centerpoint of the second object resides within the collision contour of the first object, the two objects have already collided and now overlap to some degree. In general, the more that the centerpoint of the second object intrudes within the collision contour, the greater the two objects overlap. Once the collision contour has been generated for the first object (relative to the second object), the first object can be moved relative to the second object with the same collision results, as described above, so long as the collision contour is simultaneously moved along with the first object.

Referring back to FIG. 5, one can move rectangle 21 anywhere without colliding into rectangle 20 so long as the centerpoint 35 of rectangle 21 does not touch or reside within collision contour 26. In other words, a collision has just occurred between rectangles 20 and 21 if centerpoint 35 of rectangle 21 touches collision contour 26 at any point. If centerpoint 35 of rectangle 21 resides within collision contour 26, rectangles 20 and 21 overlap to some degree. The degree of overlap typically increases, the further that centerpoint 35 intrudes within collision contour 26. The same results occur if either rectangle 20 is moved or if both rectangles 20 and 21 are moved simultaneously, as long as collision contour 26 is simultaneously moved along with rectangle 20.

The collision detector described above holds true even if a collision contour is drawn about the second object instead of the first object. In other words, it does not matter which of the two objects the collision contour is described about. For example, a collision contour could just as well have been drawn about rectangle 21 instead of rectangle 20. Hence, if the centerpoint of rectangle 20 touches or intrudes within the collision contour of rectangle 21, then rectangles 20 and 21 have collided.

Figure 6:
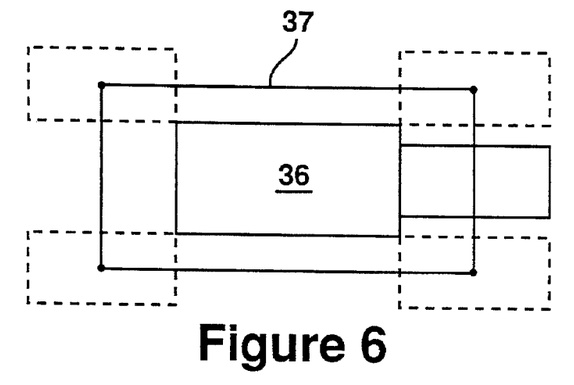
FIG. 6 illustrates a collision contour in which one of the two rectangles has been enlarged in size.
Figure 7:
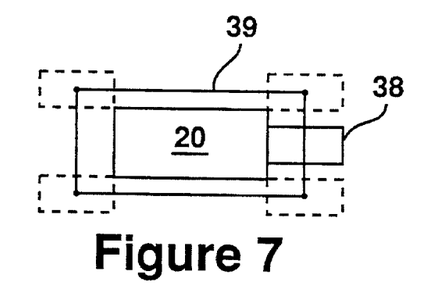
FIG. 7 illustrates a collision contour in which one of the two rectangles has been reduced in size.

One aspect of the present invention is that if the sizes of either object changes, the size of the collision contour also changes to reflect this change in size. FIG. 6 illustrates the situation of an enlarged rectangle 36. It is apparent that collision contour 37 for rectangle 36 has also been enlarged. FIG. 7 illustrates the situation of a reduced rectangle 38. It is apparent that collision contour 39 for rectangle 20 has also been reduced in size, to account for the reduced size of rectangle 38.

Figure 8:
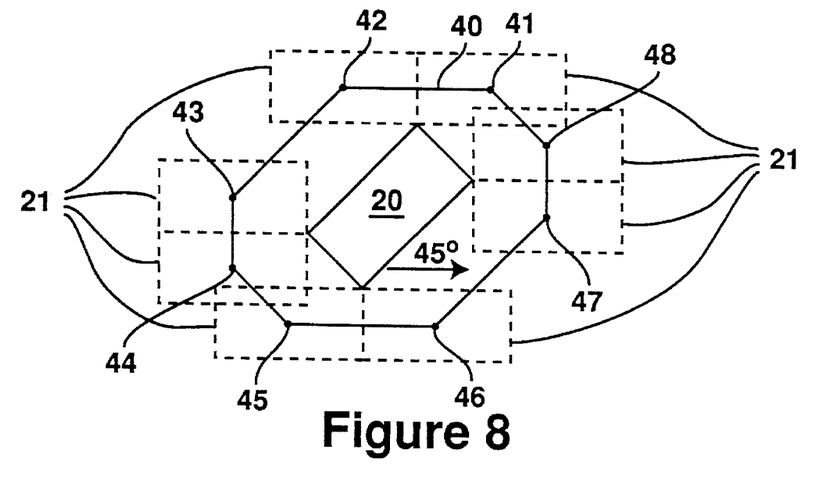
FIG. 8 illustrates a collision contour in which the first rectangle has been rotated 45 degrees to a new orientation.
Figure 9:
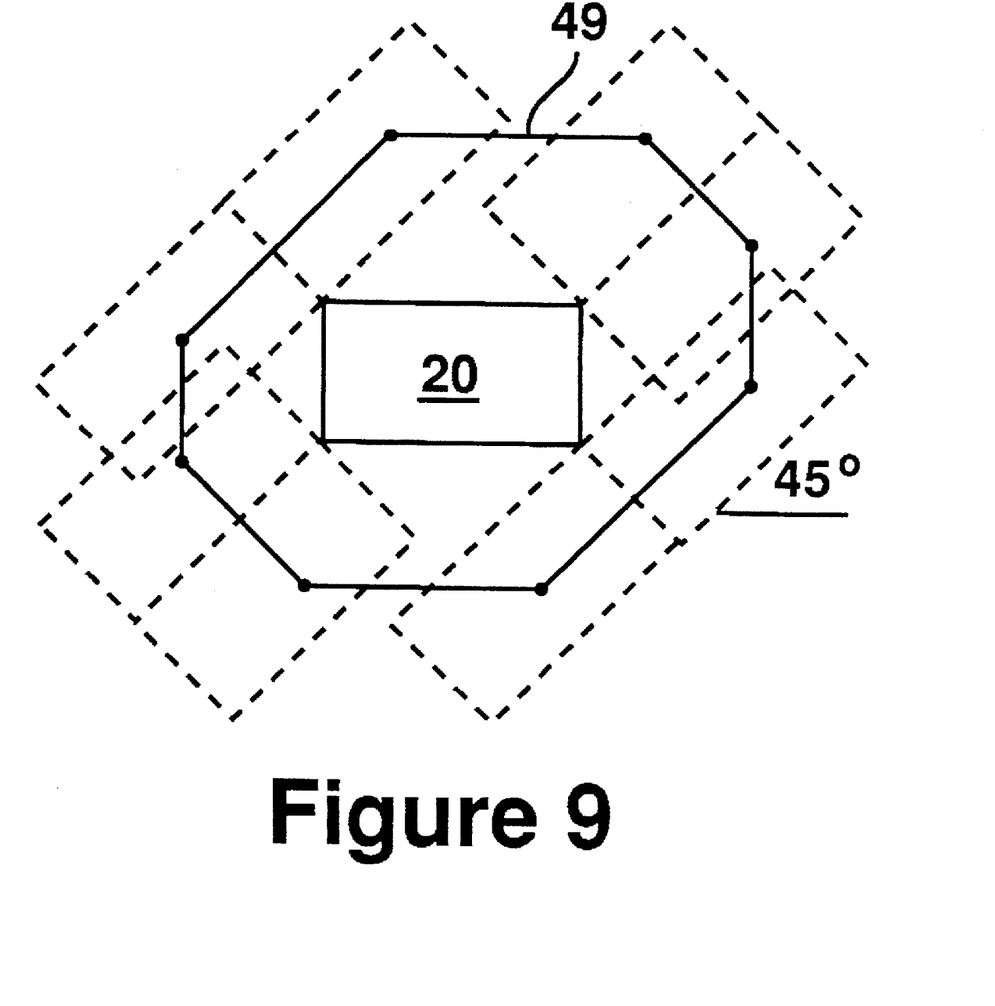
FIG. 9 illustrates a collision contour in which the second rectangle has been rotated 45 degrees to a new orientation.

Likewise, if the orientation of either object is changed, the outline of the collision contour also changes to reflect the new orientation. FIG. 8 illustrates the collision contour for the same situation as depicted in FIG. 5, except that the orientation of rectangle 20 has been skewed 45 degrees. Again, rectangle 21 is dragged around the perimeter of rectangle 20. The different positions that rectangle 21 occupies, as it is dragged about rectangle 20 while remaining in contact with rectangle 20, is shown by the dashed rectangles. It can be seen that the outline of collision contour 40 is different than the outline of collision contour 26. The reason for this change in the collision contour outline is due to the fact that rectangle 20 has been oriented at a 45 degree angle. Note that contour 40 can also be defined by connecting vertices 41–48. FIG. 9 shows the situation wherein rectangle 21 is oriented by 45 degrees. Collision contour 49 results. Note that, as shown in FIGS. 8 and 9, the rectangle which is moved about the stationary rectangle to generate the contour, is not rotated relative to a horizontal and a vertical axis; that is, the angle between any one side of the moving rectangle and either axis is constant while "tracing" the contour.

Another embodiment of the present invention is that it may be applied to avoid curved, polygonal, spherical, or three-dimensional objects. These objects can be fitted into a bounding box. Bounding boxes are defined as two dimensional bounding rectangles or three-dimensional bounding rectangular parallelepipeds.

Velocity Effects

Figure 10:
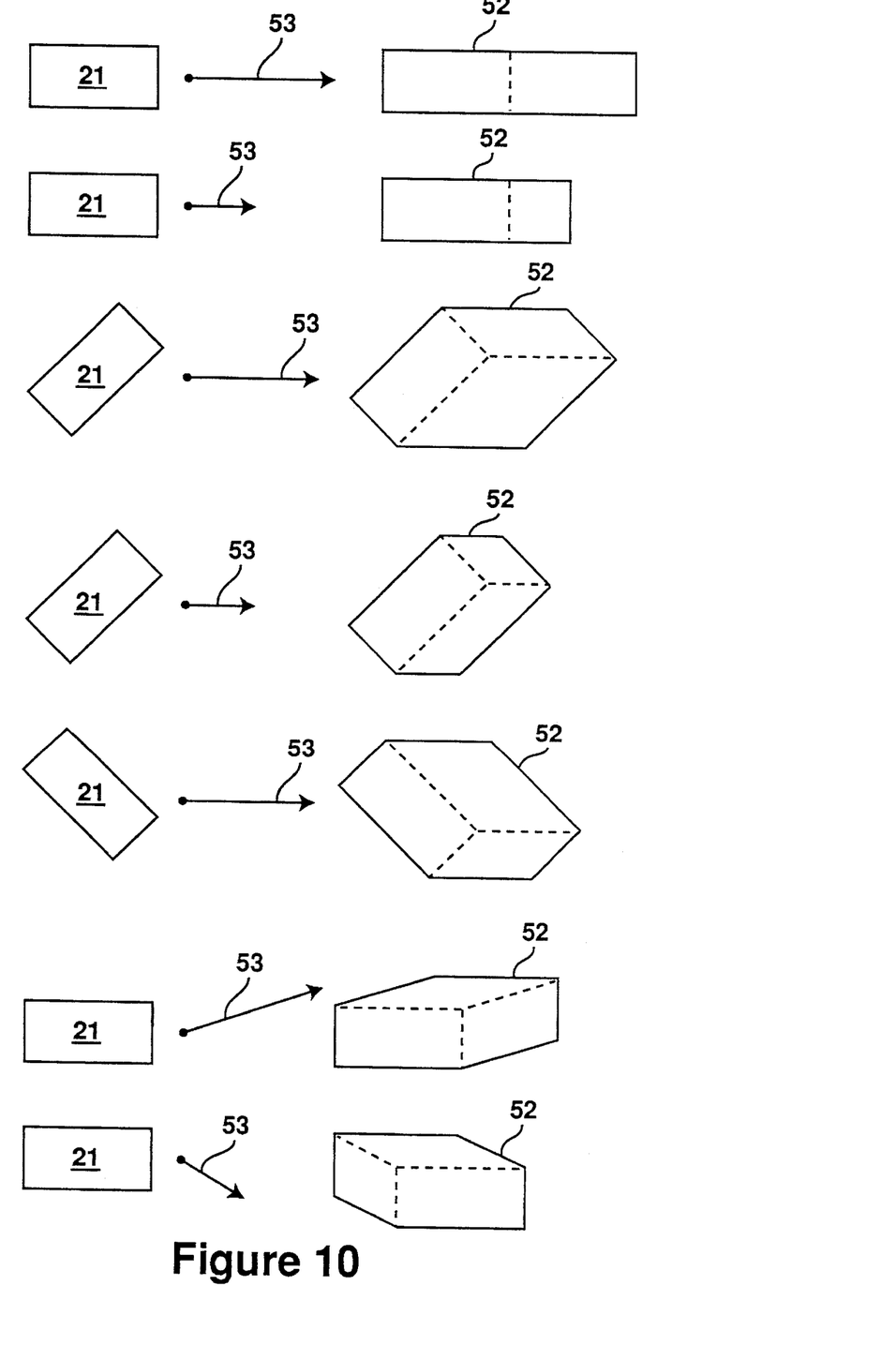
FIG. 10 show examples of velocity outlines based on rectangles of various orientation and the velocity vectors by which the rectangles are moved.

In the currently preferred embodiment of the present invention, velocity effects for both objects are also factored in. When either or both objects are moved from an initial to a final position, the present invention tests for collision between these objects, not only for their initial and final positions, but also in between those two positions. Velocity effects are accounted for, by forming a velocity outline. The velocity outline is based on the size, shape, orientation, and velocity vector of the moved object. The velocity vector describes the object's distance and direction of movement. FIG. 10 shows examples of velocity outlines 52 (represented by the solid lines). Velocity outlines 52 are based on various orientations of rectangles 21. Rectangles 21 are moved according to velocity vectors 53. Velocity vectors 53 define various directions and distances by which rectangle 21 is moved.

The collision contour for the situation wherein either or both object(s) have been moved is different from the situation wherein the same two objects remain stationary. The difference lies in the fact that when either or both object(s) are moved, their velocity effects are factored in. When the object(s) have been moved, the new collision contour is based upon the resulting velocity outline, in addition to sizes, shapes, and orientations of the object(s). When either or both object(s) are moved, the velocity outline, instead of the outline of the second object, is dragged about the perimeter of the first object in order to generate the collision contour.

Figure 11:
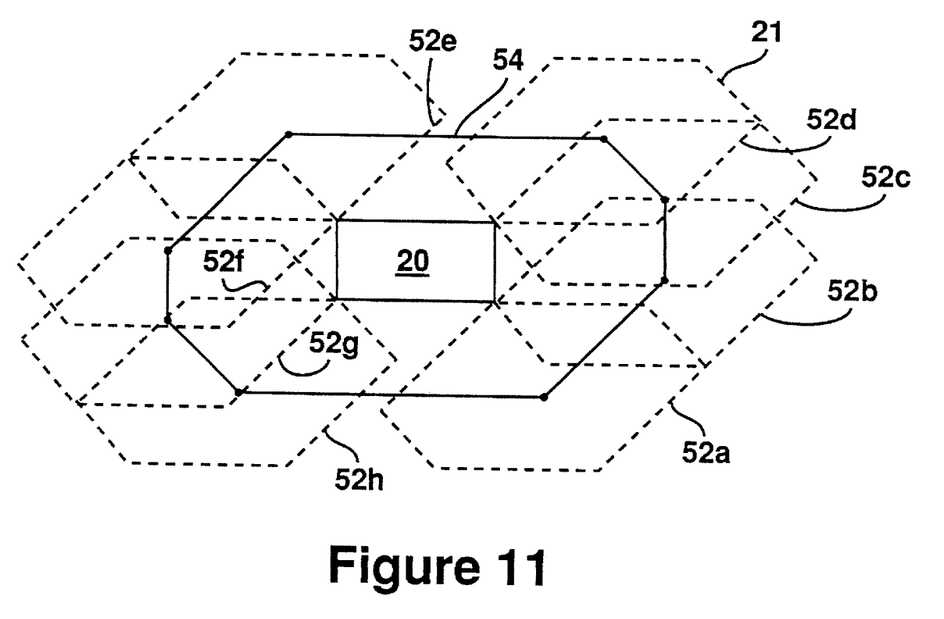
FIG. 11 illustrates a collision contour based upon a velocity outline described by a given velocity vector and orientation.

FIG. 11 illustrates generating a collision contour 54 when rectangle 21 has been moved. As an example, the third scenario from the top in FIG. 10 will be used. Based on that scenario, the direction and distance by which rectangle 21 has been moved is defined by velocity vector 53. Velocity outline 52 is described by velocity vector 53 and by the orientation of rectangle 21 (counterclockwise rotation by approximately 45 degrees). Hence, collision contour 54 is generated by "dragging" velocity outline 52 around rectangle 20 in the same manner as described above for stationary objects. The difference being that velocity outline 52, rather than rectangle 21, is "dragged" around rectangle 20. Velocity outline 52a represents a starting position. Velocity outlines 52b–h represent the various positions the velocity outline occupies as each edge of the velocity outline is dragged around the perimeter of rectangle 20. If the centerpoint of rectangle 21 does not touch or intrude within collision contour 54, there has been no collision between the two rectangles 20 and 21. This holds true throughout the path by which rectangle 21 had been moved (as defined by velocity vector 53).

If both objects are moved simultaneously, the velocity outline is formed by taking the difference between these two velocity vectors and applying it to just one of the objects which is then "dragged" around the other object to generate a collision contour for this situation. The movement of both objects will be accounted for by the collision contour based on such a velocity outline.

The Vertices

In the currently preferred embodiment of the present invention, the collision contour is generated by connecting its vertices. FIG. 5 shows four vertices 31, 32, 33, and 34. By connecting these four vertices with straight line segments, collision contour 26 is generated for rectangles 20 and 21. When rectangle 20 is rotated, as shown in FIG. 8, eight vertices 41–48 results. By connecting these eight vertices with straight line segments, collision contour 40 is generated for rectangles 20 and 21 of FIG. 8. It should be noted that additional vertices may exist. However, these additional vertices are located along the line segments and do not alter the collision contour outline.

To calculate these vertices, well-known trigonometric functions are used. First, angular relationships must be set up. The angular relationships, given two rectangles, are shown below in Table 1.

TABLE 1

ANGULAR RELATIONSHIPS OF TWO RECTANGLES vr[0][x] = −hx0 + (−xc − ys)
vr[0][y] = hy0 + s*(−xs + yc)
vr[1][x] = −hx0 + s*(−xc − ys)
vr[1][y] = hy0 + (xs + yc)
vr[2][x] = hx0 + s*(xc − ys)
vr[2][y] = hy0 + (xs + yc)
vr[3][x] = hx0 + (xc + ys)
vr[3][y] = hy0 + s*(xs − yc)
vr[4][x] = hx0 + (xc + ys)
vr[4][y] = −hy0 + s*(xs − yc)
vr[5][x] = hx0 + s*(−xc + ys)
vr[5][y] = −hy0 + (−xs − yc)
vr[6][x] = −hx0 + s*(−xc + ys)
vr[6][y] = −hy0 + (−xs − yc)
vr[7][x] = −hx0 + (−xc − ys)
vr[7][y] = −hy0 + s*(−xs + yc)

These relationships are defined by:
 hx0=half the length of the first rectangle
 hy0=half the height of the first rectangle
 xc=half the length of the second rectangle times the absolute value of the cosine of delta $q_3$ where q is the degree of rotation in reference to the x-axis and delta $q_3$ is the angular difference between the second rectangle's theta ($q_2$) and, the first rectangle's theta ($q_1$)
 yc=half the height of second rectangle times the absolute value of cosine of delta $q_3$.
 xs=half the length of the second rectangle times the absolute value of sine of delta $q_3$.
 ys=half the height of the second rectangle times the absolute value of sine of delta $q_3$.
 s=the sign (i.e. either positive or negative 1) of the value of sin(delta $q_3$)*cos (delta $q_3$).

Figure 12:
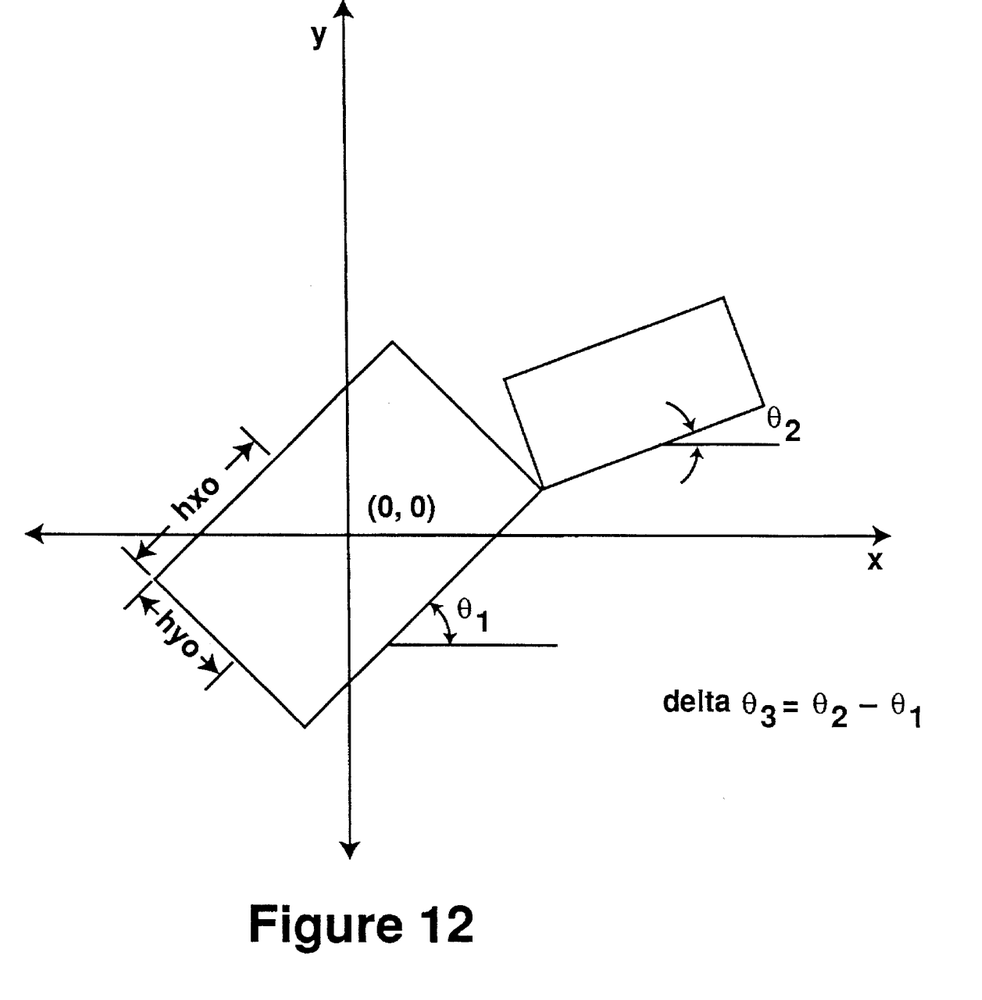
FIG. 12 shows input parameters used in determining the collision contour in reference to two sample rectangles.

These parameters are shown in FIG. 12.

Next, velocity effects are factored in. The x-axis delta velocity component (velx) is computed by subtracting the first rectangle's x-axis velocity component from the second rectangle's x-axis velocity component. Similarly, the y-axis delta velocity second component (vely) is computed by subtracting the first rectangle's y-axis velocity component from the second rectangle's y-axis velocity component.

If there is motion, then two variables, alpha and dangle, are determined. Alpha is defined as being the arctangent of two times -vely divided by -velx. Dangle is defined as being alpha minus the modulus of $q_1$ and $2\pi$($\pi$=3.14 . . . ). Both the modulus and the dangle variable are forced into the range -$\pi$ and +$\pi$. Next, a determination is made as to the quadrant in which dangle resides. The quadrants are in reference to the four areas into which a plane is divided by the reference axes in a Cartesian coordinate system. The quadrants are designated first, second, third, and fourth, counting counterclockwise from the area in which both coordinates are positive.

Furthermore, an orientation flag is set if either (1) {th0≦th1 and a1≧th1 } or {a1≦th0} or (2) a1≦th0 AND th1≦a1: where th0 is the modulus of the first rectangle's theta and half $\pi$; th1 is the modulus of the second rectangle's q and half $\pi$; and a1 is the modulus of the arctangent of twice the delta y-axis velocity component divided by the delta x-axis velocity component and half $\pi$.

If the two objects have not been moved, alpha is set to 0.0, dangle is set to be in quadrant 1, and the orientation flag is set.

There are sixteen possible vertices. However, a number of these vertices do not exist for some collision contours. Thus, it must first be determined whether the vertex even exists. If so, its coordinates are then calculated.

The x-axis coordinate for vertex 1 ($vx_1$) is calculated by taking the angular relationship calculated earlier, vr[0][x], and multiplying it by the cos of $q_1$ and subtracting from this, vr[0][y] times the sine of $q_1$ (i.e., $vx_1$=vr[0][x] *cos $q_1$− vr[0][y]*sin$q_1$). Likewise, the y-coordinate for vertex1 ($vy_1$), is calculated by taking the angular relationship, vr[0][x], multiplying it by the sine of $q_1$ and adding to this, vr[0][y] times cos $q_1$ (i.e., vy=vr[0][x]*sin$q_1$+vr[0][y]*cos$q_1$). If dangle is in either quadrants 2 or 3, then velx and vely are subtracted from the coordinates of vertex 2, respectively.

Vertex 2 is generated if dangle is in either quadrants 1 or 3, the orientation flag is set, and either of the rectangles has been moved. The x and y-axes coordinates for vertex 2 are the same as $vx_1$ and $vy_1$. However, if dangle is in quadrant 1, then velx and vely are subtracted from $vx_1$ and $vy_1$, respectively, to give the new coordinates for vertex 2, $vx_2$ and $vy_2$.

Vertex 3 is defined by its x and y-axes coordinates, $vx_3$ and $vy_3$. These coordinates are calculated by the following equations:

$$vx_3 = vr[1][x]*\cos q_1 - vr[1][y]*\sin q_1$$

$$vy_3 = vr[1][x]*\sin q_1 + vr[1][y]*\cos q_1$$

However, if either 1) dangle is in the second quadrant, 2) the orientation flag is set and dangle is in quadrant 1, or 3) dangle is in quadrant 3 and the orientation flag is not set, then velx and vely are subtracted from $vx_3$ and $vy_3$, respectively, to give the new coordinates for vertex 3.

Vertex 4 exists only if dangle is in either quadrants 1 or 3 and the orientation flag is not set. If vertex 4 exists, and if dangle is in the first quadrant, velx and vely are subtracted from $vx_3$ and $vy_3$, respectively, to give the new coordinates $vx_4$ and $vy_4$. Otherwise, $vx_4=vx_3$ and $vy_4=vy_3$.

The coordinates for vertex 5 are given by the following equations:

$$vx_5=vr[2][x].cosq_1-vr[2][y]*sinq_1;$$

$$vy_5=vr[2][x]*sinq_1+vr[2][y]*cosq_1;$$

If dangle is in either the first or second quadrants, then velx and vely are subtracted from these coordinates to give the new $vx_5$ and $vy_5$ coordinates.

Vertex 6 exists only if 1) dangle is in either quadrants 2 or 4 and 2) the orientation flag is set. Normally, $vx_6=vx_5$ and $vy_6=vy_5$. However, if dangle is in quadrant 4, then $vx_6=vx_5-velx$ and $vy_6=vy_5-vely$.

The coordinates for vertex 7 are given by the following two equations:

$$vx_7=vr[3][x]*cos\,q_1 - vr[3][y]*sin\,q_1$$

$$vy_7=vr[3][x]*sin\,q_1 + vr[3][y]*cos\,q_1$$

However, if either 1) dangle is in quadrant 1 or 2) dangle is in quadrant 4 and the orientation flag is set or 3) dangle is in quadrant 2 and the orientation flag is not set, then velx and vely are subtracted from $vx_7$ and $vy_7$, respectively, to give the new values of $vy_7$ and $vy_7$.

Vertex 8 exists if dangle is in either quadrants 2 or 4 and the orientation flag is not set. If dangle is in the fourth quadrant, then $vx_8=vx_7-velx$ and $vy_8=vy_7-vely$. Otherwise, $vx_7=vx_6$ and $vy_7=vy_6$.

The coordinates for vertex 9 are given by the following equations:

$$vx_9=vr[4][x]*cosq_1-vr[4][y]*sin\,q_1$$

$$vy_9=vr[4][x]*sinq_1+vr[4][y]*cosq_1$$

If dangle is in either quadrants 4 or 1, velx and vely are subtracted from $vx_9$ and $vy_9$, respectively, to give the new values of $vx_9$ and $vy_9$.

Vertex 10 exists if dangle is in either quadrants 1 or 3, the orientation flag is set, and either of the two rectangles has been moved. If dangle is in quadrant 3, then $vx_{10}=vx_9-velx$ and $vy_{10}=vy_9-vely$. Otherwise, $vx_{10}=vx_9$ and $vy_{10}=vy_9$.

The coordinates for vertex 11 are given by the following equations:

$$vx_{11}=vr[5][x]*cos\,q_1-vr[5][y]*sin\,q_1$$

$$vy_{11}=vr[5][x]*sin\,q_1+vr[5][y]*cos\,q_1.$$

If either 1) dangle is in the fourth quadrant or 2) dangle is in the third quadrant and the orientation flag is set or 3) dangle is in the first quadrant and the orientation flag is not set, then velx and vely are subtracted from $vx_{11}$ and $vy_{11}$, respectively, to give the new values of $vx_{11}$ and $vy_{11}$.

Vertex 12 exists if dangle is in either quadrants 1 or 3 and the orientation flag is not set. If dangle is in the third quadrant, then $vx_{12}=vx_{11}-velx$ and $vy_{12}=vy_{11}-vely$. Otherwise, $vx_{12}=vx_{11}$ and $vy_{12}=vy_{11}$.

The coordinates for vertex 13 are given by the following equations:

$$vx_{13}=vr[6][x]*cosq_1-vr[6][y]*sin\,q_1$$

$$vy_{13}=vf[6][x]*sinq_1+vr[6][y]*cosq_1.$$

However, if dangle is in either quadrant 3 or 4, then velx and vely are subtracted from $vx_{13}$ and $vy_{13}$, respectively, to give the new values of $vx_{13}$ and $vy_{13}$.

Vertex 14 exists if dangle is in either quadrants 2 or 4 and the orientation flag is set. If dangle is in quadrant 2, then $vx_{14}=vx_{13}-velx$ and $vy_{14}=vy_{13}-vely$. Otherwise, $vx_{14}=vx_{13}$ and $vy_{14}=vy_{13}$.

The coordinates for vertex 15 are given by the following equations:

$$vx_{15}=vr[7][x].cosq_1-vr[7][y]*sinq_1$$

$$vy_{15}=vr[7][x]*sinq_1+vr[7][y]*cosq_1.$$

However, if either 1) dangle is in the third quadrant or 2) dangle is in the second quadrant and the orientation flag is set or 3) dangle is in the fourth quadrant and the orientation flag is set, then velx and vely are subtracted from $vx_{15}$ and $vy_{15}$, respectively, to give the new values for $vx_{15}$ and $vy_{15}$.

Vertex 16 exists if dangle is in either quadrants 2 or 4 and the orientation flag is not set. If dangle is in quadrant 2, then $vx_{16}=vx_{15}-velx$ and $vy_{16}=vy_{15}-vely$. Otherwise, $vx_{16}=vx_{15}$ and $vy_{16}=vy_{15}$.

These vertices define the collision contour for two rectangles of varying sizes, orientation, and velocity effects.

An Example of Vertices Calculations

Figure 13:
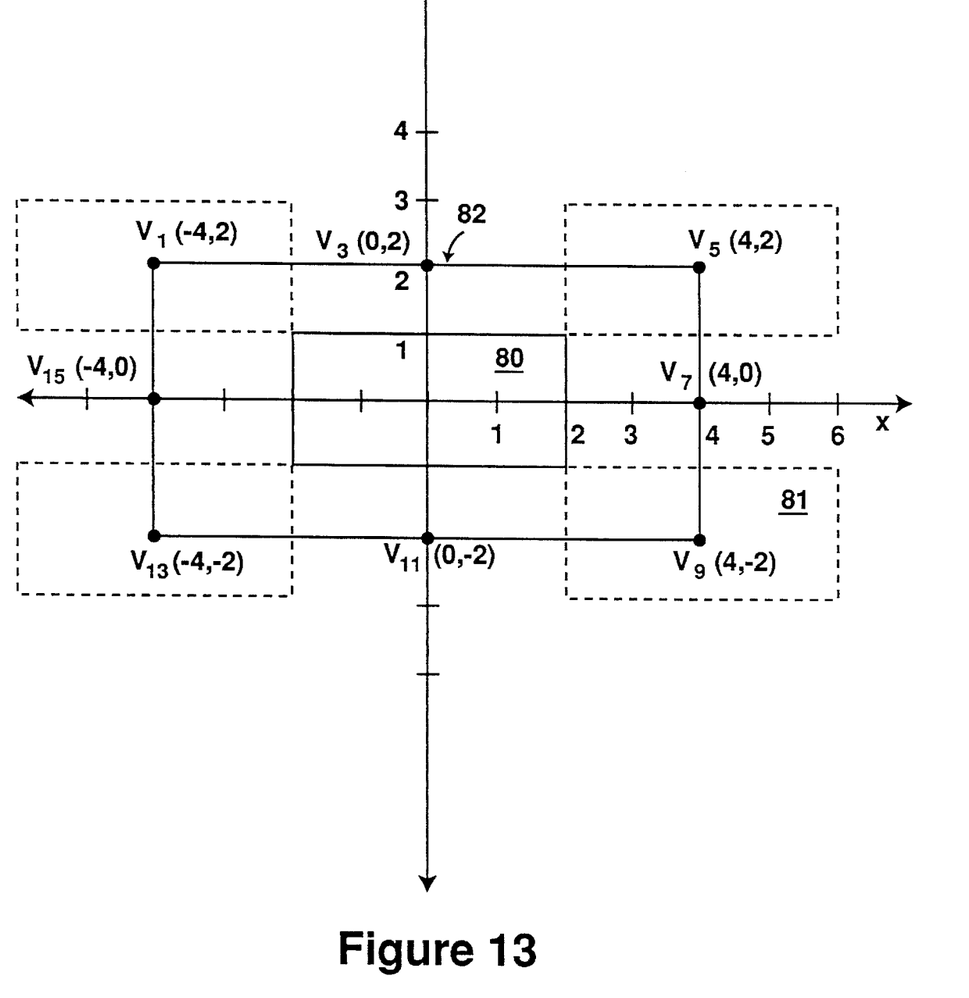
FIG. 13 shows two stationary rectangles and the coordinates for the vertices defining the collision contour for the rectangles.

An example will now be offered, describing how the vertices are calculated, according to the equations discussed above. The example will be made in reference to two stationary rectangles 80 and 81, as shown in FIG. 13. For rectangles 80 and 81, collision contour 82 will result. In order to calculate the vertices which define collision contour 82, initial parameters must first be assigned. These initial parameters, derived from the dimensions and orientations of rectangles 80 and 81, are given in below Table 2.

TABLE 2

| RETANGULAR PARAMETERS |
| --- |
| hx0 = half the length of rectangular 80 = ½(4) = 2 |
| hy0 = half the height of rectangular 80 = ½(2) = 1 |
| xc = half the length of rectangular 81 times cos(delta $q_3$) = ½(4)cos(0) = 2 |
| yc = half the height of rectangle 81 times cos(delta $q_3$) = ½(2)cos(0) = 1 |
| xs = half the length of rectangular 81 times sin(delta $q_3$) = ½(4)sin(0) = 0 |
| ys = half the height of rectangle 81 times sin(delta $q_3$) = ½(2)sin(0) = 0 |
| s = the sign + 1 |
| st0 = sin($q_1$) = sin(0) = 0 |
| ct0 = cos($q_1$) = cos(0) = 1 |
| delta $q_3$ = $q_2$ − $q_1$ = 0 − 0 = 0 |
| st = sin(delta $q_3$) = sin(0) = 0 |
| ct = cos(delta $q_3$) = cos(0) = 1 |
| st = abs(st) = abs(0) = 0 |
| ct = abs(ct) = abs(1) = 1 |

These parameters are used in calculating the various angular relationships which were defined in Table 1 (above). The angular relationships for rectangles 80 and 81 are given in Table 3.

TABLE 3

| RECTANGULAR VERTICES |
| --- |
| vr[o][x] = −2 + (−2− 0) = −4 |
| vr[o][y] = 1 + 1(0 + 1) = 2 |
| vr[1][x] = −2 + 1(2 − 0) = 0 |
| vr[1][y] = 1 + (0 + 1) = 2 |
| vr[2][x] = 2 + 1(2 − 0) = 4 |

TABLE 3-continued

RECTANGULAR VERTICES vr[2][y] = 1 + (0 + 1) = 2
vr[3][x] = 2 + (2 + 0) = 4
vr[3][y] = 1 + 1(0 − 1) = 0
vr[4][x] = 2 + (2 + 0) = 4
vr[4][y] = −1 + 1(0 − 1) = −2
vr[5][x] = 2 + 1(−2 + 0) = 0
vr[5][y] = −1 + (0 − 1) = −2
vr[6][x] = −2 + 1(−2 + 0) = −4
vr[6][y] = −1 + (0 − 1) = −2
vr[7][x] = −2 + (−2 − 0) = −4
vr[7][y] = −1 + 1(0 + 1) = 0

Now, based on the parameters and angular relationships calculated above, the x and y-coordinates for each vector may be calculated.

Vertex 1:
$vx_1 = -4\cos(0) - 2\sin(0) = -4$
$vy_1 = -4\sin(0) + 2\cos(0) = 2$

Vertex 2:
Does not exist because rectangles 80 and 81 had not been moved. (No velocity effects.)

Vertex 3:
$vx_3 = 0\cos(0) - 2\sin(0) = 0$
$vy_3 = 0\sin(0) + 2\cos(0) = 2$

Vertex 4:
Does not exist because the orientation flag is set.

Vertex 5:
$vx_5 = 4\cos(0) - 2\sin(0) = 4$
$vx_5 = 4\sin(0) + 2\cos(0) = 2$

Vertex 6:
Does not exist because dangle is not either quadrants 2 or 4. (Dangle is in quadrant 1.)

Vertex 7:
$vx_7 = 4\cos(0) - 0\sin(0) = 4$
$vx_7 = 4\sin(0) + 0\cos(0) = 0$

Vertex 8:
Does not exist because dangle is not in either quadrants 2 or 4.

Vertex 9:
$vx_9 = 4\cos(0) - 2\sin(0) = 4$
$vy_9 = 4\sin(0) + (-2)\cos(0) = -2$

Vertex 10:
Does not exist because rectangles 80 and 81 have not been moved.

Vertex 11:
$vx_{11} = 0\cos(0) - (-2)\sin(0) = 0$
$vy_{11} = 0\sin(0) + (-2)\cos(0) = -2$ Vertex 12:
Does not exist because the orientation flag is set.

Vertex 13:
$vx_{13} = -4\cos(0) - (-2)\sin(0) = -4$
$vy_{13} = -4\sin(0) + (-2)\cos(0) = -2$ Vertex 14:
Does not exist because dangle is not in either quadrants 2 or 4.

Vertex 15:
$vx_{15} = -4\cos(0) - 0\sin(0) = -4$
$vy_{15} = -4\sin(0) + 0\cos(0) = 0$ Therefore, collision contour 82 is described by connecting the vertices which were calculated above: (−4,2), (0,2), (4,2), (4,0), (4,−2), (0,−2), (−4,−2), and (−4,0). These vertices are shown in FIG. 13 as v1–15(odd). It is apparent that by connecting the vertices, collision contour 82 results.

Cyrus-Beck Algorithm

After calculating these vertices, it must be determined whether the centerpoint of the second rectangle resides on or is included within this collision contour. A collision between these two rectangles will have occurred if and only if the centerpoint of the second rectangle resides on or is included within this collision contour. In the currently preferred embodiment of the present invention, this test is accomplished by using the Cyrus-Beck algorithm. Cyrus-Beck is a parametric line-clipping algorithm.

Figure 14:
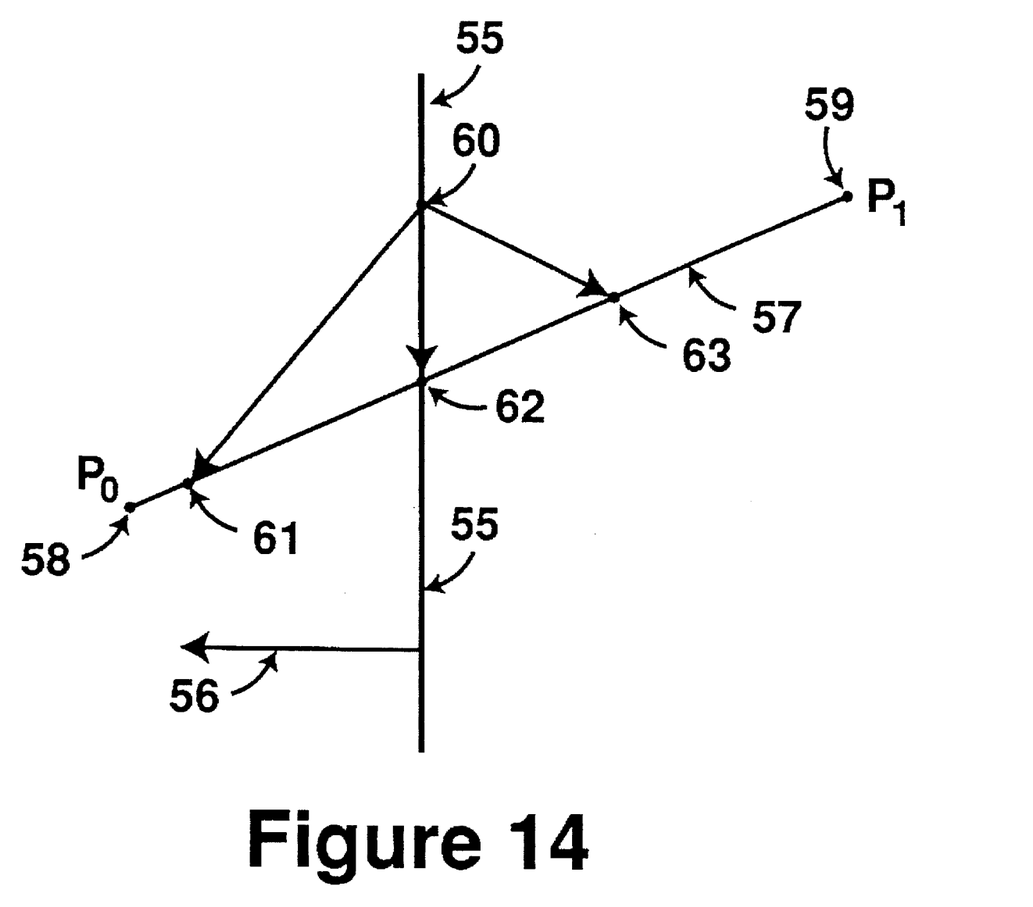
FIG. 14 is an illustration of how a Cyrus-Beck algorithm works in determining whether a point is included within a half plane.

The Cyrus-Beck algorithm is based on the intersection between two lines. It is described in Foley and Van Dam, *Fundamentals of Interactive Computer Graphics*, Addison-Wesley, 1982, pp. 117–124. FIG. 14 shows an edge 55 represented by a vertical line of the collision contour. Line 56 describes a normal N, outward to line 55. Line segment 57, which extends from $P_0$58 to $P_1$59, is clipped to edge 55. Line segment 57 represents the possible positions which the second rectangle's centerpoint can occupy. Line segment 57 can be represented parametrically as $P(t) = P_o + (P_1 - P_o)t$, where t=zero at $P_o$ and t=1 at $P_1$.

An arbitrary point, $P_E$60, on edge 55 is chosen and referenced to three points 61, 62, and 63. Point 61 is an endpoint on line segment 57. Point 61 resides on the outside halfplane of edge 55. Point 62 is the point of intersection of line segment 57 and edge 55. Point 63 is an endpoint on line segment 57. Point 63 resides on the inside halfplane of edge 55. The region in which the second rectangle's centerpoint lies, can be distinguished by examining the value of the dot product $N \cdot [P(t) - P_E]$. This value is negative for a point on the inside halfplane, zero for a point on edge 55, and positive for a point that is within the outside halfplane.

Consequently, if the value of the dot product, $N \cdot [P(t) - P_E]$, is 0 for any collision contour edge, then the second rectangle's centerpoint is touching the collision contour. If the value of the dot product is negative for all collision contour edges, then the second rectangle's centerpoint is intruding within the collision contour. This signifies that a collision has occurred between the two rectangles. Otherwise, there is no collision between the two rectangles.

Figure 15A:
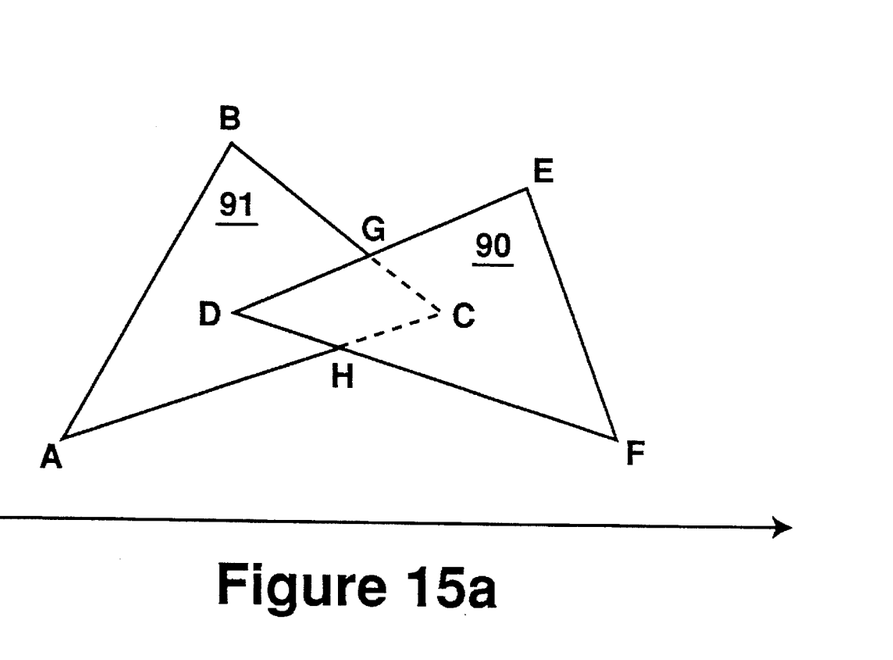
FIG. 15a is a computer generated display of the visible surfaces after a collision between two objects.

In the currently preferred embodiment, the present invention is used to display computer generated visible surfaces between two objects. An example is shown in FIG. 15a. Two triangles 90 and 91 are shown. Triangle 90 is "nearer" than triangle 91. Thus, the area by which the two triangles had collided must be "cut out" of triangle 91. In other words, the area of collision as represented by DGCH must be removed from triangle 91.

Figure 15B:
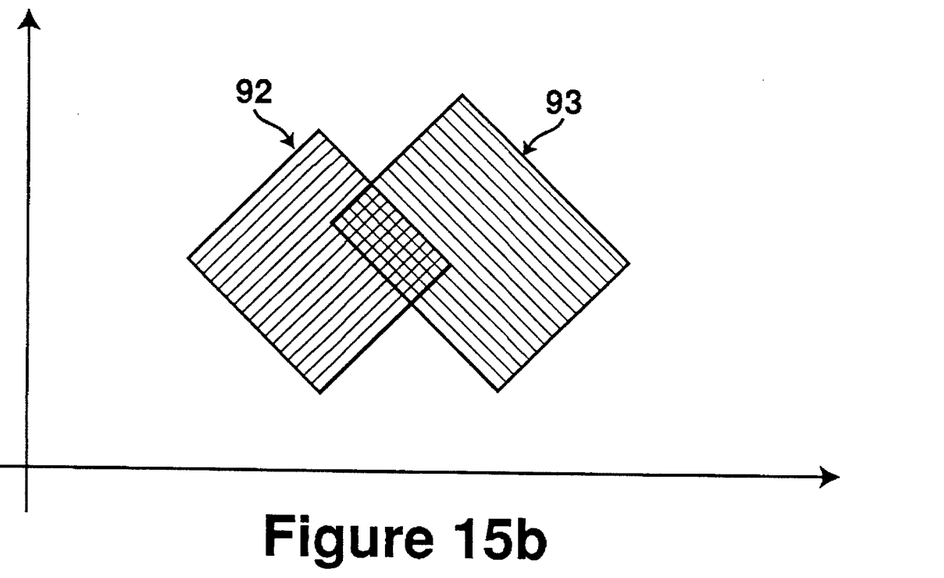
FIG. 15b is a computer generated display of the shading or blending of the area of collision between two objects.

In an alternative embodiment, the present invention is used to display the area of collision between two objects by shading or color blending this area. This is illustrated in FIG. 15b. The two rectangles 92 and 93 have collided. The crosshatched area represents the area of collision. This crosshatched area can be shaded or colored differently than rectangles 92 and 93. Alternatively, the area of collision can be represented by blending the different colors of the two rectangles 92 and 93. For example, if rectangle 92 were blue and rectangle 93 were green, the area of collision would be represented in a turquoise color. After determining there is a collision by using the method of the invention, well-known rendering techniques/means may be used to produce a display as shown in FIGS. 15a or 15b.

Flowchart of the Collision Detection Method

Figure 16:
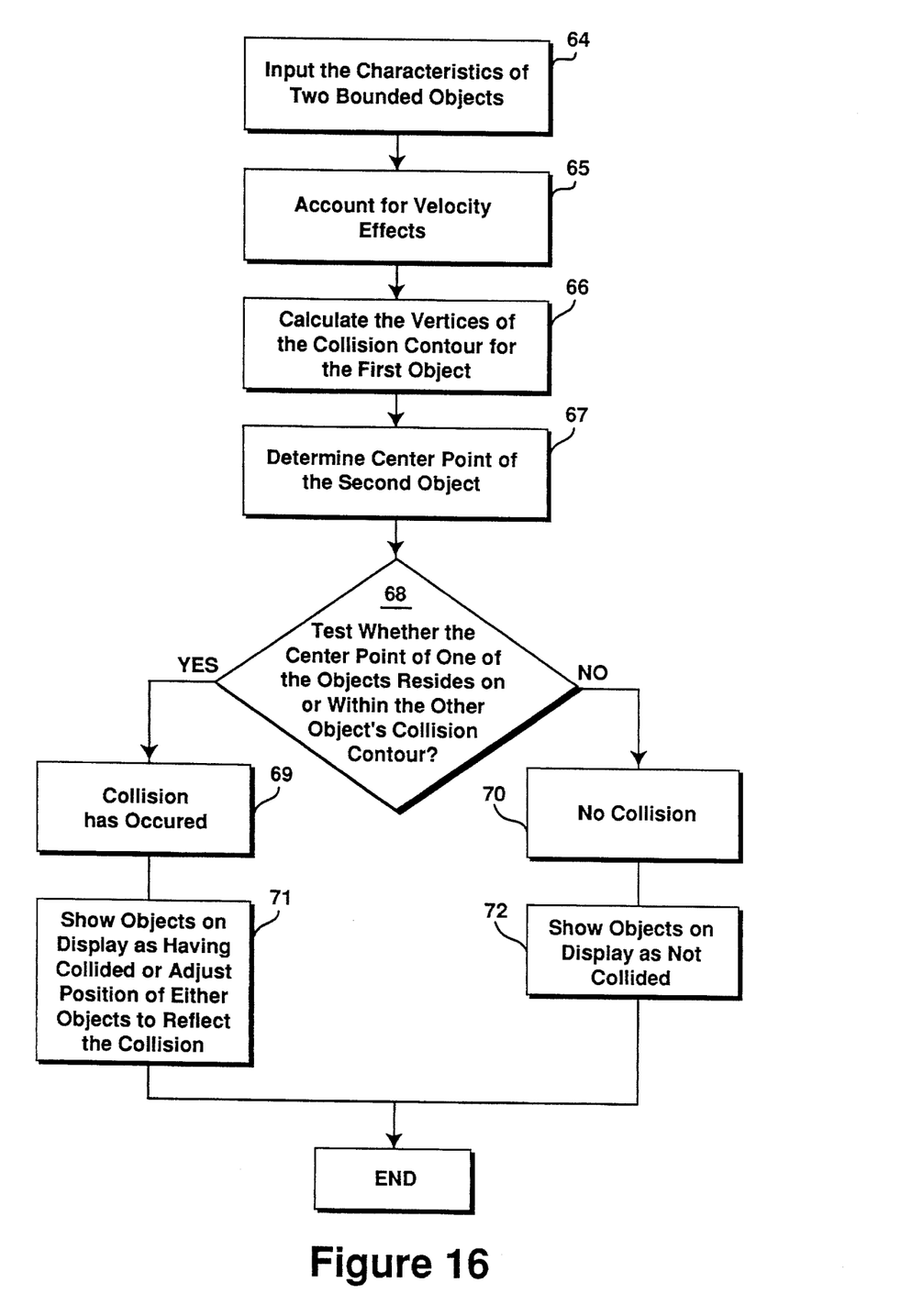
FIG. 16 is a flowchart detailing the method of the preferred embodiment of the present invention.

FIG. 16 is a flowchart of the collision detection method. FIG. 16 will now be referred to in order to further describe the method and apparatus of the invention. In step 64, the characteristics of two bounded objects are typically inputted into a data storage device (e.g., RAM). These characteristics would typically be input by other software components, but may come directly from the user interface. Some characteristics include the x and y-axes lengths of the two objects, the orientations (rotations) of the two objects, and their velocities (distances and directions). In step 65, the velocity effects of the two objects, if any, are accounted for in the manner described above. A velocity outline will be generated for the object(s) which had been moved. If both objects had moved simultaneously, the velocity outline is formed by taking the difference between the two objects' velocity vectors and applying this difference to just one of the objects.

In step 66, the vertices of the first object's collision contour are calculated. The calculations are according to the characteristics of the two objects and the velocity effects. These vertices are based on certain angular relationships of the two objects and well-known trigonometric functions.

In step 67, the second object's centerpoint is determined. Step 68 tests whether this centerpoint resides on or within the first object's collision contour. In the currently preferred embodiment, this test is performed by using the Cyrus-Beck algorithm. If the centerpoint resides on or within the collision contour, this indicates that a collision had occurred between these two objects. This is shown in step 69. The display then shows the objects as having collided (e.g., by shading or color blending) in step 71. In an alternative embodiment, in step 71, the present invention may be used to adjust the position of the computer graphic objects so that they do not overlap when displayed. Otherwise, there has been no collision between these two objects. This situation is represented in step 70. The display shows the objects as not having collided in step 72.

Thus, an apparatus and method for detecting collisions between two bounded objects by using a collision contour has been described.

What is claimed is:

1. A method for detecting a collision between a first object and a second object in a computer controlled display system, wherein at least one of said first object and said second object is non-circular, said method comprising:

reading characteristics of said first object and said second object from a memory of said computer controlled display system, wherein said characteristics indicate a shape, size and orientation of said first object and a shape, size and orientation of said second object;

generating a collision contour for a particular time, corresponding to said first object based upon said shape, size and orientation of said first object and said shape, size and orientation of said second object;

determining a centerpoint of said second object for said particular time;

determining whether said centerpoint of said second object for said particular time is included in said collision contour for said particular time;

generating a signal indicating whether said first object and said second object are in a state of collision, wherein inclusion of said centerpoint in said collision contour indicates that said first object is in a state of collision with said second object, wherein if said centerpoint does not reside in said collision contour, then said first object and said second object are not in a state of collision; and displaying whether said first object ,and said second object are in a state of collision.

2. The method according to claim 1 further including the steps of determining, prior to generation of said collision contour, a bounding box based on said shape, size and or orientation of said first object, wherein said first object is enclosed by said bounding box, wherein said collision contour is generated based on shape, size and orientation of said bounding box.

3. The method according to claim 1 further including the steps of:

determining, prior to generation of said collision contour, a first bounding box based on said shape, size and orientation of said first object, wherein said first object is enclosed by said first bounding box;

determining, prior to generation of said collision contour, a second bounding box based on said shape, size and orientation of said second object, wherein said second object is enclosed by said second bounding box; and wherein said collision contour is generated based on shape, size, orientation, and a velocity outline of each bounding box of said first bounding box and said second bounding box.

4. The method according to claim 3 further including the steps of:

determining a first velocity outline based on said shape, size and orientation of said first object, and on a first velocity vector representing a direction and a distance by which said first object has moved during a period of time; and determining a second velocity outline based on said shape, size and orientation of said second object, and on a second velocity vector representing a direction and a distance by which said second object has moved during a period of time.

5. The method according to claim 1 wherein said step of generating said collision contour includes the step of generating a set of vertices representing endpoints of an outline surrounding said first object and dependent upon said shape, size and orientation of said first object, and said shape, size and orientation of said second object.

6. The method according to claim 1 wherein said step of determining whether said centerpoint of said second object is included in said collision contour is accomplished by using a Cyrus-Beck algorithm.

7. The method of claim 1 wherein said collision contour is defined by a trace of said centerpoint of said second object as said second object is moved around the perimeter of said first object in a manner wherein an edge of said second object is coincident to, but does not overlap an edge of said first object.

8. The method according to claim 1 wherein said collision contour is generated based on shape, size, orientation, and a velocity outline of each object of said first object and said second object; and further including the steps of:

determining a first velocity outline based on said shape, size and orientation of said first object, and on a first velocity vector representing a direction and a distance by which said first object has moved during a period of time; and determining a second velocity outline based on said shape, size and orientation of said second object, and on a second velocity vector representing a direction and a distance by which said second object has moved during a period of time.

9. The method according to claim 1 wherein said step of generating said collision contour for said particular time includes generating said collision contour for a time at which said first object is moving.

10. The method according to claim 9 wherein said step of generating said collision contour for said particular time includes generating said collision contour for a time at which said first object is moving and said second object is moving.

11. In a computer system, an apparatus for displaying a collision between a first object and a second object, wherein at least one of said first object and said second object is non-circular, the apparatus comprising:

a memory having stored therein characteristics of said first object and said second object, said characteristics indicating a shape, size and orientation of said first object and a shape, size and orientation of said second object;

a processing unit coupled to said memory for generating a collision contour for a particular time, for said first object and for determining a centerpoint of said second object for said particular time, wherein said processing unit generates said collision contour based on said shape, size and orientation of said first object and said shape, size and orientation of said second object;

a circuit for determining whether said centerpoint of said second object for said particular time is included within said collision contour for said particular time, inclusion of said centerpoint in said collision contour indicating said first object is in a state of collision with said second object and exclusion of said centerpoint in said second object indicating said first object is not in a state of collision with said second object; and a graphics display device coupled to said processing unit for displaying whether said first object is in a state of collision with said second object.

12. The apparatus according to claim 11 wherein said first object is enclosed by a bounding box based on said shape, size and orientation of said first object; wherein said collision contour is generated based on shape, size and orientation of said bounding box.

13. The apparatus according to claim 11 wherein said characteristics include shape, size, orientation, and a first velocity outline for said first object and shape, size, orientation, and a second velocity outline for said second object; and wherein said collision contour is generated based on shape, size, orientation and a velocity outline for each of said first object and said second object.

14. The apparatus according to claim 13 wherein said first velocity outline is based on said shape, size and orientation of said first object, and on a first velocity vector representing a direction and a distance by which said first object has moved during a period of time and said second velocity outline is based on said shape, size and orientation of said second object, and on a second velocity vector representing a direction and a distance by which said second object has moved during a period of time.

15. The apparatus according to claim 11 wherein said collision contour includes a set of vertices representing endpoints of an outline surrounding said first object and dependent upon said shape, size arid orientation of said first object and said shape, size and orientation of said second object.

16. The apparatus according to claim 11 wherein said first object is a moving object.

17. A method for adjusting positions between a first object and a second object in a computer display system so that said first object and said second object do not overlap when displayed, wherein at least one of said first object and said second object is non-circular, said method comprising:

reading characteristics of said first object and said second object stored in a memory of said computer display system, said characteristics indicating a shape, size and orientation of said first object and a shape, size and orientation of said second object;

generating a collision contour for a particular time, for said first object based upon said shape, size and orientation of said first object and said shape, size and orientation of said second object;

determining a centerpoint of said second object for said particular time;

generating a signal indicating whether said first object and said second object are in a state of collision, wherein inclusion of said centerpoint in said collision contour indicates that said first object is in a state of collision with said second object, wherein if said centerpoint does not reside in said collision contour, then said first object and said second object are not in a state of collision;

if said first object and said second object are in a state of collision, positioning said second object so that said centerpoint of said second object is not included in said collision contour; and displaying said first object and said second object.

18. The method according to claim 17 wherein said first object is enclosed by a bounding box based on said shape, size and orientation of said first object; wherein said collision contour is generated based on shape, size and orientation of said bounding box.

19. In a computer system, an apparatus for adjusting positions between a first object and a second object so that said first object and said second object do not overlap when displayed, wherein at least one of said first object and said second object is non-circular, comprising:

a memory having stored therein characteristics of said first object and said second object, said characteristics indicating a shape, size and orientation of said first object and a shape, size and orientation of said second object;

a processing unit coupled to said memory for generating a collision contour for a particular time for said first object and for determining a centerpoint of said second object for said particular time, said processing unit generating said collision contour based on said shape, size and orientation of said first object and said shape, size and orientation of said second object;

a circuit for determining whether said centerpoint of said second object for said particular time, is included within said collision contour for said particular time, inclusion of said centerpoint in said collision contour indicating said first object is in a state of collision with said second object and exclusion of said centerpoint in said second object indicating said first object is not in a state of collision with said second object;

an adjustment means for positioning said first object and said second object if said first object and said second object are in a state of collision according to said circuit, so that said centerpoint of said second object is not included in said collision contour; and a graphics display device coupled to said processing unit for displaying said first object and said second object.

20. The apparatus according to claim 19 wherein said first object is enclosed by a first bounding box based on said shape, size and orientation of said first object, and said second object is enclosed by a second bounding box based on said shape, size and orientation of said second object, wherein said collision contour is generated based on shape, size and orientation of each of said first bounding box arid said second bounding box.

\* \* \* \* \*